US010587317B2

(12) United States Patent
Athley et al.

(10) Patent No.: US 10,587,317 B2
(45) Date of Patent: Mar. 10, 2020

(54) DETERMINATION OF COMPLEX WEIGHT VECTORS FOR A RADIO TRANSCEIVER DEVICE

(71) Applicant: Telefonaktiebolaget LM Ericsson (publ), Stockholm (SE)

(72) Inventors: Fredrik Athley, Kullavik (SE); Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 119 days.

(21) Appl. No.: 15/543,865

(22) PCT Filed: Jun. 27, 2017

(86) PCT No.: PCT/EP2017/065924
§ 371 (c)(1),
(2) Date: Jul. 14, 2017

(87) PCT Pub. No.: WO2019/001692
PCT Pub. Date: Jan. 3, 2019

(65) Prior Publication Data
US 2018/0375552 A1    Dec. 27, 2018

(51) Int. Cl.
*H04B 7/0456* (2017.01)
*H04B 7/06* (2006.01)
(Continued)

(52) U.S. Cl.
CPC ........ *H04B 7/0456* (2013.01); *H01Q 3/2652* (2013.01); *H01Q 3/40* (2013.01);
(Continued)

(58) Field of Classification Search
CPC combination set(s) only.
See application file for complete search history.

(56) References Cited

U.S. PATENT DOCUMENTS

2003/0017835 A1* 1/2003 Bergel ................. H04B 7/0634
455/502
2005/0085197 A1* 4/2005 Laroia ..................... H01Q 3/24
455/101
(Continued)

FOREIGN PATENT DOCUMENTS

EP         2 346 190 A2    7/2011

OTHER PUBLICATIONS

International Search Report and Written Opinion issued in International Application No. PCT/EP2017/065924, dated Mar. 22, 2018, 16 pages.
(Continued)

*Primary Examiner* — Sung S Ahn
(74) *Attorney, Agent, or Firm* — Rothwell, Figg, Ernst & Manbeck, P.C.

(57) ABSTRACT

There is provided mechanisms for determining complex weight vectors. A method is performed by a radio transceiver device. The method comprises obtaining measurements of reference signals. The reference signals are transmitted by another radio transceiver device by applying precoding weight vectors in a sequential order at an analog antenna array of said another radio transceiver device. The precoding weight vectors as well as the sequential order are known to the radio transceiver device. The method comprises determining channel estimates for each individual antenna element of the antenna array by using the measurements in combination with knowledge of the precoding weight vectors and the sequential order. The method comprises determining complex weight vectors to be used for subsequent data transmission from said another radio transceiver device based on the channel estimates. The method comprises providing an indication of the complex weight vectors to said another radio transceiver device.

24 Claims, 4 Drawing Sheets

(51) Int. Cl.
*H01Q 3/40* (2006.01)
*H01Q 3/26* (2006.01)
*H04B 7/08* (2006.01)

(52) U.S. Cl.
CPC .......... *H04B 7/063* (2013.01); *H04B 7/0617* (2013.01); *H04B 7/0695* (2013.01); *H04B 7/088* (2013.01); *H04B 7/0854* (2013.01)

(56) References Cited

U.S. PATENT DOCUMENTS

| | | | | |
|---|---|---|---|---|
| 2009/0262694 | A1* | 10/2009 | Lee | H04B 7/0621 370/329 |
| 2013/0029711 | A1* | 1/2013 | Kang | H04W 72/046 455/509 |
| 2015/0372842 | A1* | 12/2015 | Wicker, Jr. | H04L 25/0242 375/267 |

OTHER PUBLICATIONS

International Preliminary Report on Patentability issued in International Application No. PCT/EP2017/065294, dated Jul. 25, 2019, 22 pages.

* cited by examiner

US 10,587,317 B2

DETERMINATION OF COMPLEX WEIGHT VECTORS FOR A RADIO TRANSCEIVER DEVICE

CROSS REFERENCE TO RELATED APPLICATION(S)

This application is a 35 U.S.C. § 371 National Stage of International Patent Application No. PCT/EP2017/065924, filed Jun. 27, 2017, designating the United States, the disclosure of which is incorporated by reference.

TECHNICAL FIELD

Embodiments presented herein relate to methods, radio transceiver devices, computer programs, and a computer program product for determining complex weight vectors and for obtaining complex weight vectors.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

The terminal devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed.

FIG. 1 illustrates a schematic example of a radio transceiver device 300 with analog beamforming implemented in a terminal device. The radio transceiver device 300 comprises a baseband (BB) processing block 340 operatively connected to an analog antenna array. The antenna array has 6 antenna elements 370 with one gain controller 360 and phase shifter 350 per antenna element 370. The gain controller and phase shifter are used for setting beamforming weights for the antenna elements. As schematically illustrated in FIG. 1 the antenna elements 370 are pointing in different directions in order to achieve omni-directional-like coverage for the radio transceiver device 300.

Terminal devices with analog beamforming are expected in many cases to use reciprocity based uplink (UL) beamforming. That is, the beamforming weights used for uplink transmissions can be based on downlink (DL) measurements. However, in some cases this will not be possible, for example if the analog beamforming is not calibrated between DL and UL, for frequency-division duplexing (FDD) applications, or if different antennas are used for DL and UL at the terminal device. For such cases it could be cumbersome to find the proper beamforming weights for UL transmissions.

A typical closed-loop precoding scheme, such as used in e.g. Long Term Evolution (LTE) telecommunication systems for digital antenna arrays, where one reference signal is transmitted from each antenna element and the TRP evaluates different precoders and feeds back the best precoder index to the terminal device, cannot be applied for analog beamforming implementations. This is because it is not possible to transmit a reference signal for an isolated antenna element. Instead, for analog beamforming the transmission automatically occurs simultaneously on all antenna elements in the antenna array.

Hence, there is a need for an efficient way to acquire beamforming weights of an analog array, especially for UL transmissions.

SUMMARY

An object of embodiments herein is to provide mechanisms that enable efficient determination of beamforming weighs.

According to a first aspect there is presented a method for determining complex weight vectors. The method is performed by a radio transceiver device. The method comprises obtaining measurements of reference signals.

The reference signals are transmitted by another radio transceiver device by applying precoding weight vectors in a sequential order at an analog antenna array of said another radio transceiver device. The precoding weight vectors as well as the sequential order are known to the radio transceiver device. The method comprises determining channel estimates for each individual antenna element of the antenna array by using the measurements in combination with knowledge of the precoding weight vectors and the sequential order. The method comprises determining complex weight vectors to be used for subsequent data transmission from said another radio transceiver device based on the channel estimates. The method comprises providing an indication of the complex weight vectors to said another radio transceiver device.

According to a second aspect there is presented a radio transceiver device for determining complex weight vectors. The radio transceiver device comprises processing circuitry. The processing circuitry is configured to cause the radio transceiver device to obtain measurements of reference signals. The reference signals are transmitted by another radio transceiver device by applying precoding weight vectors in a sequential order at an analog antenna array of said another radio transceiver device. The precoding weight vectors as well as the sequential order are known to the radio transceiver device. The processing circuitry is configured to cause the radio transceiver device to determine channel estimates for each individual antenna element of the antenna array by using the measurements in combination with knowledge of the precoding weight vectors and the sequential order. The processing circuitry is configured to cause the radio transceiver device to determine complex weight vectors to be used for subsequent data transmission from said another radio transceiver device based on the channel estimates. The processing circuitry is configured to cause the radio transceiver device to provide an indication of the complex weight vectors to said another radio transceiver device.

According to a third aspect there is presented a radio transceiver device for determining complex weight vectors. The radio transceiver device comprises processing circuitry and a storage medium. The storage medium stores instructions that, when executed by the processing circuitry, cause the radio transceiver device to perform operations, or steps. The operations, or steps, cause the radio transceiver device to obtain measurements of reference signals. The reference signals are transmitted by another radio transceiver device by applying precoding weight vectors in a sequential order at an analog antenna array of said another radio transceiver device. The precoding weight vectors as well as the sequential order are known to the radio transceiver device. The operations, or steps, cause the radio transceiver device to determine channel estimates for each individual antenna element of the antenna array by using the measurements in combination with knowledge of the precoding weight vectors and the sequential order. The operations, or steps, cause the radio transceiver device to determine complex weight vectors to be used for subsequent data transmission from said another radio transceiver device based on the channel estimates. The operations, or steps, cause the radio transceiver device to provide an indication of the complex weight vectors to said another radio transceiver device.

According to a fourth aspect there is presented a radio transceiver device for determining complex weight vectors. The radio transceiver device comprises an obtain module configured to obtain measurements of reference signals. The reference signals are transmitted by another radio transceiver device by applying precoding weight vectors in a sequential order at an analog antenna array of said another radio transceiver device. The precoding weight vectors as well as the sequential order are known to the radio transceiver device. The radio transceiver device comprises a determine module configured to determine channel estimates for each individual antenna element of the antenna array by using the measurements in combination with knowledge of the precoding weight vectors and the sequential order. The radio transceiver device comprises a determine module configured to determine complex weight vectors to be used for subsequent data transmission from said another radio transceiver device based on the channel estimates. The radio transceiver device comprises a provide module configured to provide an indication of the complex weight vectors to said another radio transceiver device.

According to a fifth aspect there is presented a computer program for determining complex weight vectors. The computer program comprises computer program code which, when run on processing circuitry of a radio transceiver device, causes the radio transceiver device to perform a method according to the first aspect.

According to a sixth aspect there is presented a method for obtaining complex weight vectors. The method is performed by a radio transceiver device. The method comprises transmitting reference signals to another radio transceiver device by applying precoding weight vectors in a sequential order at an analog antenna array of the radio transceiver device. The precoding weight vectors as well as the sequential order are known to said another radio transceiver device. The method comprises obtaining an indication of the complex weight vectors from said another radio transceiver device, wherein the complex weight vectors are based on channel estimates for each individual antenna element of the antenna array, wherein the channel estimates have been determined using measurements of the reference signals in combination with knowledge of the precoding weight vectors and the sequential order, and wherein the complex weight vectors are to be used for subsequent data transmission to said another radio transceiver device.

According to a seventh aspect there is presented a radio transceiver device for obtaining complex weight vectors. The radio transceiver device comprises processing circuitry. The processing circuitry are configured to cause the radio transceiver device to transmit reference signals to another radio transceiver device by applying precoding weight vectors in a sequential order at an analog antenna array of the radio transceiver device. The precoding weight vectors as well as the sequential order are known to said another radio transceiver device. The processing circuitry are configured to cause the radio transceiver device to obtain an indication of the complex weight vectors from said another radio transceiver device, wherein the complex weight vectors are based on channel estimates for each individual antenna element of the antenna array, wherein the channel estimates have been determined using measurements of the reference signals in combination with knowledge of the precoding weight vectors and the sequential order, and wherein the complex weight vectors are to be used for subsequent data transmission to said another radio transceiver device.

According to an eighth aspect there is presented a radio transceiver device for obtaining complex weight vectors. The radio transceiver device comprises processing circuitry and a storage medium. The storage medium stores instructions that, when executed by the processing circuitry, cause the radio transceiver device to perform operations, or steps. The operations, or steps, cause the radio transceiver device to transmit reference signals to another radio transceiver device by applying precoding weight vectors in a sequential order at an analog antenna array of the radio transceiver device. The precoding weight vectors as well as the sequential order are known to said another radio transceiver device. The operations, or steps, cause the radio transceiver device to obtain an indication of the complex weight vectors from said another radio transceiver device, wherein the complex weight vectors are based on channel estimates for each individual antenna element of the antenna array, wherein the channel estimates have been determined using measurements of the reference signals in combination with knowledge of the precoding weight vectors and the sequential order, and wherein the complex weight vectors are to be used for subsequent data transmission to said another radio transceiver device.

According to a ninth aspect there is presented a radio transceiver device for obtaining complex weight vectors. The radio transceiver device comprises a transmit module configured to transmit reference signals to another radio transceiver device by applying precoding weight vectors in a sequential order at an analog antenna array of the radio transceiver device. The precoding weight vectors as well as the sequential order are known to said another radio transceiver device. The radio transceiver device comprises an obtain module configured to obtain an indication of the complex weight vectors from said another radio transceiver device, wherein the complex weight vectors are based on channel estimates for each individual antenna element of the antenna array, wherein the channel estimates have been determined using measurements of the reference signals in combination with knowledge of the precoding weight vectors and the sequential order, and wherein the complex weight vectors are to be used for subsequent data transmission to said another radio transceiver device.

According to a tenth aspect there is presented a computer program for obtaining complex weight vectors, the computer program comprising computer program code which, when run on processing circuitry of a radio transceiver device, causes radio transceiver device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, and these computer programs provide efficient determination of complex weight vectors that could define beamforming weighs.

Advantageously these complex weight vectors could be applied as beamforming weights of an analog array and be suitable for UL transmissions.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 2:
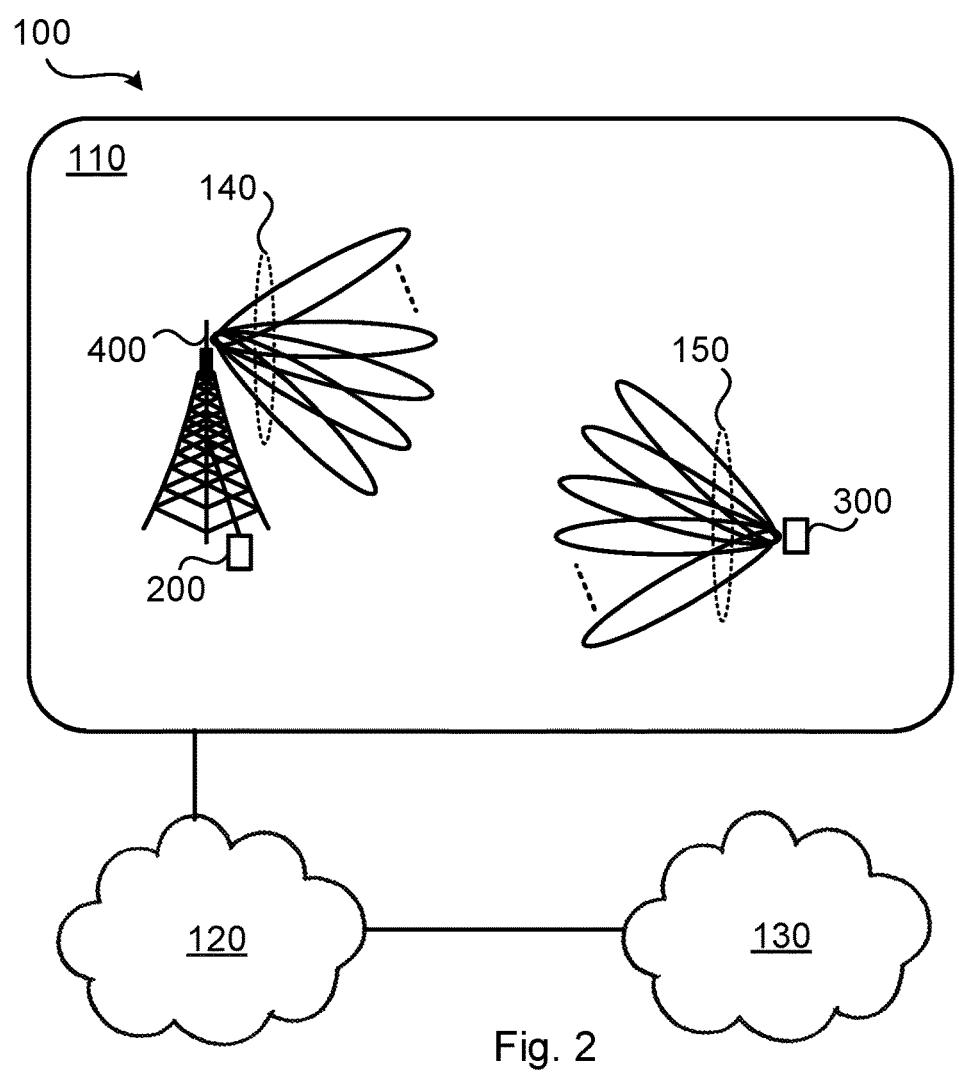
FIG. 2 is a schematic diagram illustrating a communications network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a radio transceiver device 200 that is configured to provide network access to radio transceiver device 300 in a radio access network 110. The radio access network 110 is operatively connected to a core network 120. The core network 120 is in turn operatively connected to a service network 130, such as the Internet. The radio transceiver device 300a is thereby, via the radio transceiver device 200, enabled to access services of, and exchange data with, the service network 130. The radio transceiver device 200 could provide network access in the radio access network 110 by transmitting signals to, and receiving signals from, the radio transceiver device 300 in beams 140. The signals could be transmitted from, and received by, a TRP 400 of the radio transceiver device 200. The TRP 400 could form an integral part of the radio transceiver device 200 or be physically separated from the radio transceiver device 200. In turn, the radio transceiver device 300 could transmit signals to, and receive signals from, the radio transceiver device 200 in beams 150. The beams 140, 150 do not need to be narrow, so-called, pencil beams, but can have any kind of pattern.

Typically, the radio transceiver device 200 is a network node and the radio transceiver device 300a is a terminal device.

Examples of network nodes are radio access network nodes, radio base stations, base transceiver stations, Node Bs, evolved Node Bs, gNBs, access points, and access nodes.

Figure 1:
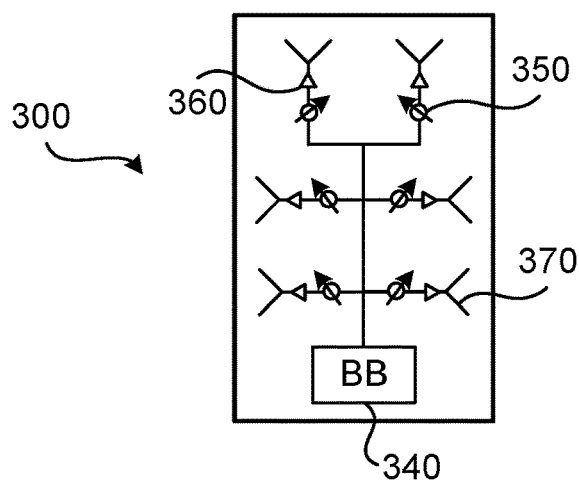
FIG. 1 is a schematic illustration of a radio transceiver device implemented as a terminal device according to embodiments.

For example, as in FIG. 1, radio transceiver device 300 could be provided with analog beamforming and be implemented as a terminal device. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

As disclosed above there is a need for an efficient way to acquire beamforming weights of an analog array, especially for UL transmissions.

The embodiments disclosed herein thus relate to mechanisms for determining complex weight vectors and obtaining complex weight vectors.

In order to obtain such mechanisms there is provided a radio transceiver device 200, a method performed by radio transceiver device 200, a computer program product comprising code, for example in the form of a computer program, that when run on processing circuitry of radio transceiver device 200, causes radio transceiver device 200 to perform the method. In order to obtain such mechanisms there is further provided a radio transceiver device 300, a method performed by radio transceiver device 300, and a computer program product comprising code, for example in the form of a computer program, that when run on processing circuitry of radio transceiver device 300, causes radio transceiver device 300 to perform the method.

Figures 3, 4:
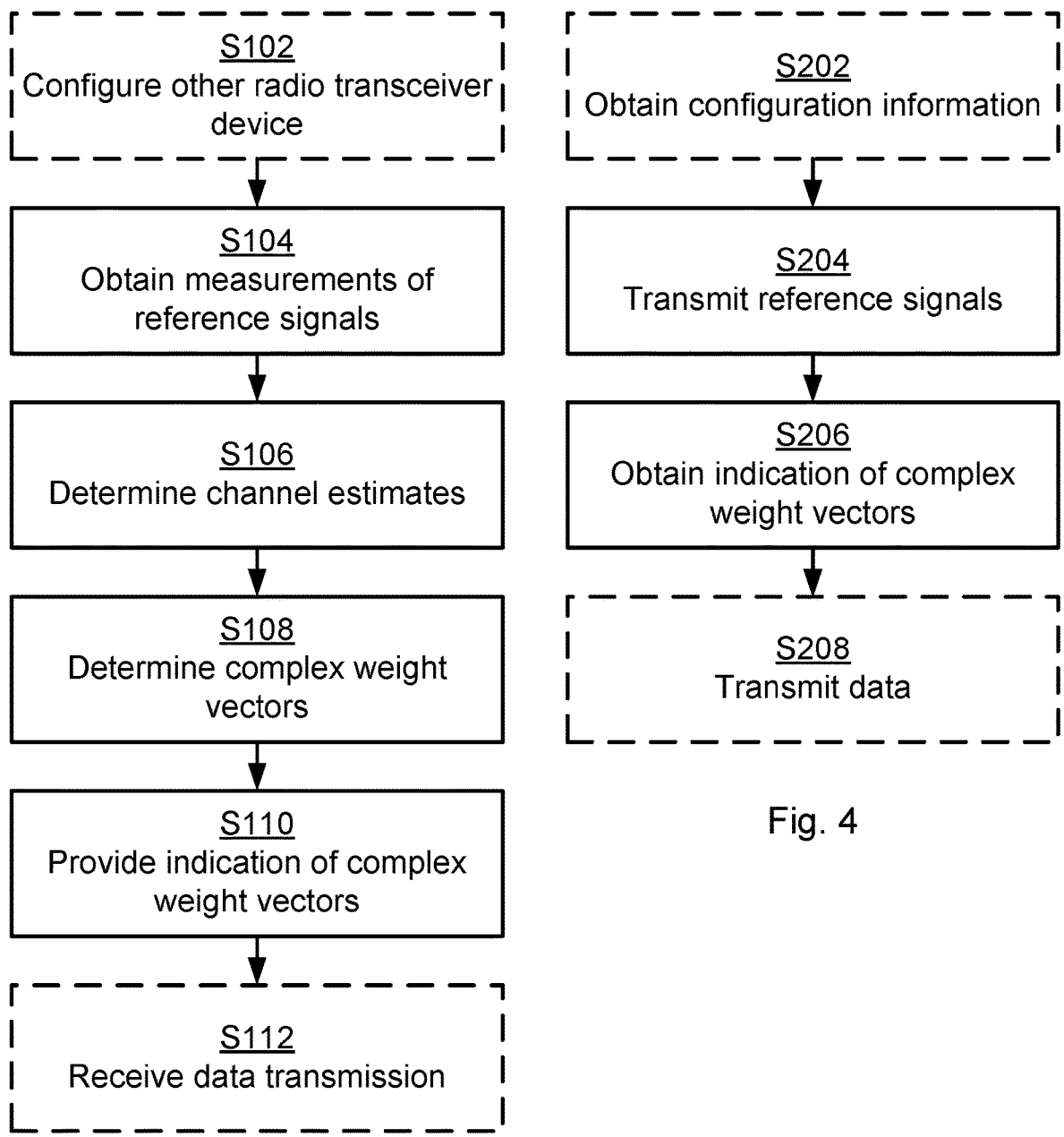
FIGS. 3 and 4 are flowcharts of methods according to embodiments.

FIG. 3 is a flowchart illustrating embodiments of methods for determining complex weight vectors as performed by radio transceiver device 200. FIG. 4 is a flowchart illustrating embodiments of methods for obtaining complex weight vectors as performed by radio transceiver device 300. The methods are advantageously provided as computer programs 1020a, 1020b.

Reference is now made to FIG. 3 illustrating a method for determining complex weight vectors for radio transceiver device 300 as performed by radio transceiver device 200 according to an embodiment.

The complex weight vectors are based on measurements of signals transmitted by radio transceiver device 300. Hence, radio transceiver device 200 is configured to perform step S104:

S104: Radio transceiver device 200 obtains measurements of reference signals. The reference signals are transmitted by radio transceiver device 300. The reference signals are transmitted by radio transceiver device 300 applying precoding weight vectors in a sequential order at an analog antenna array of radio transceiver device 300. The precoding weight vectors as well as the sequential order (in which the precoding weight vectors are applied) are known to radio transceiver device 200.

Channel estimates are needed in order to determine the complex weight vectors. Radio transceiver device 200 uses the knowledge of the precoding weight vectors and the sequential order together with the measurements of the reference signals to determine channel estimates for each individual antenna element of the analog array at radio transceiver device 300. Hence, radio transceiver device 200 is configured to perform step S106:

S106: Radio transceiver device 200 determining channel estimates for each individual antenna element of the antenna array. The channel estimates are determined by using the measurements in combination with knowledge of the precoding weight vectors and the sequential order. Examples of how to perform the channel estimation will be disclosed below.

The complex weight vectors are then determined based on the channel estimates. Hence, radio transceiver device 200 is configured to perform step S108:

S108: Radio transceiver device 200 determines the complex weight vectors to be used for subsequent data transmission from radio transceiver device 300 based on the channel estimates. Examples of how to determine the complex weight vectors will be disclosed below.

In order for radio transceiver device 300 to be able to use the complex weight vectors it need to receive information that identifies the complex weight vectors. Therefore, radio transceiver device 200 is configured to perform step S110:

S110: Radio transceiver device 200 provides an indication of the complex weight vectors to radio transceiver device 300.

This method enables the determination of suitable beamforming weights, as defined by the complex weight vectors, that can be used for UL transmission for radio transceiver devices 300 with analog antenna arrays and in scenarios without DL/UL reciprocity.

Embodiments relating to further details of determining complex weight vectors as performed by radio transceiver device 200 will now be disclosed.

There could be different ways for radio transceiver device 200 to know the precoding weight vectors and the sequential order in which the precoding weight vectors are to be applied at radio transceiver device 300. In some aspects the precoding weight vectors and the sequential order are hard-coded, or standardized. In other aspects radio transceiver device 200 configures radio transceiver device 300 with the precoding weight vectors and the sequential order. Hence, according to an embodiment radio transceiver device 200 is configured to perform (optional) step S102:

S102: Radio transceiver device 200 configures radio transceiver device 300 with the precoding weight vectors and the sequential order in which the precoding weight vectors are to be applied. The radio transceiver device 300 is configured before radio transceiver device 200 obtains the measurements.

The precoding weight vectors and the sequential order could be provided as configuration information to radio transceiver device 300.

As disclosed above, the complex weight vectors to be used for subsequent data transmission from radio transceiver device 300. Hence, according to an embodiment radio transceiver device 200 is configured to perform (optional) step S112:

S112: Radio transceiver device 200 receives a data transmission from radio transceiver device 300. The data transmission is transmitted by radio transceiver device 300 using the complex weight vectors applied at the analog antenna array (of radio transceiver device 300).

There could be different ways to determine the channel estimates.

In some aspects the channel estimates are found by inverting the precoding matrix used by radio transceiver device 300. That is, according to an embodiment the precoding weight vectors are taken from a precoding matrix, and determining the channel estimates involves inverting the precoding matrix.

In some aspects the channel estimates are found using zero-forcing (ZF) channel estimation or linear minimum mean square error (LMMSE) channel estimation.

In some aspects Equations (1) and (2) are implemented in radio transceiver device 200 and used to transform the channel estimates for the M to N channel estimates such that there is one channel estimate for each antenna element at radio transceiver device 300:

$$\hat{c}_b = \begin{bmatrix} \hat{c}_{b1} \\ \hat{c}_{b2} \\ \vdots \end{bmatrix} = [w_1 \quad w_2 \quad \ldots]^H c_{el} = W^H c_{el} \qquad (1)$$

-continued $$\hat{c}_{el} = (WW^H)^{-1}W\hat{c}_b \qquad (2)$$

The matrix $W=[w_1\ w_2\ \ldots\ ]$ comprises precoding weight vectors $w_1, w_2, \ldots$ as applied at radio transceiver device 300. In Equations (1) and (2) the parameter $\hat{c}_{bk}$ is the estimated channel in beam space after applying a precoder $w_k$ during transmission of the reference signals at radio transceiver device 300 and is found as $\hat{c}_{bk}=w_k^H c_{el}$, where $c_{el}$ is the channel vector (of dimension N-by-1) in antenna element space. In Equation (2), $X^{-1}$ denotes the inverse of matrix X, and $X^H$ denotes the conjugate, or Hermitian, transpose of matrix X.

The matrix pseudo inverse is used in Equation (2) to cover the general case when M>N. For the case M=N, orthogonal complex weight vectors (for example DFT weight vectors) are used. The channel estimator in Equation (2) is a zero forcing estimator which has good performance at high SNR. At low SNR, an LMMSE estimator could be more suitable. For the LMMSE estimator the estimated channel coefficients in the antenna element space are given as:

$$\hat{c}_{el} = (R_{el}^{-1} + WR_{nb,nb}^{-1}W^H)^{-1}WR_{nb,nb}^{-1}\hat{c}_b \qquad (3)$$

In Equation (3), $R_{el}=E[c_{el}c_{el}^H]$, where $E[x]$ is the mathematical expectation of x, the parameter $R_{nb,nb}$ is a matrix representing correlation of the noise in the beam space. The parameter $R_{el}$ is not invertible unless the channel has full rank. By using the matrix inversion lemma the estimated channel coefficients in the antenna element space for the LMMSE estimator can therefore be formulated as:

$$\hat{c}_{el} = [R_{el} - R_{el}(R_{el} + (WR_{nb,nb}^{-1}W^H)^{-1})^{-1}R_{el}]WR_{nb,nb}^{-1}\hat{c}_b \qquad (4)$$

In some aspects Equation (4) is implemented in radio transceiver device 200 and used to transform the channel estimates for the M to N channel estimates such that there is one channel estimate for each antenna element at radio transceiver device 300.

There could be different ways to determine the complex weight vectors.

In some aspects the complex weight vectors determined as the candidate that maximizes a quality criterion. That is, according to an embodiment the complex weight vectors are determined so as to maximize a quality criterion of the subsequent data transmission. Non-limiting examples of quality criteria are signal-to-interference-plus-noise ratio (SINR), signal-to-noise (SNR), and channel capacity.

In some aspects the channel estimates are averaged over multiple time samples. In particular, according to an embodiment the complex weight vectors are based on channel estimates as averaged over at least two time samples of the reference signals. In more detail an averaging of channel estimations over multiple time sample can be used to attain a covariance matrix, $R_b$, in the beam space. The covariance matrix, $R_{el}$, in the antenna element space can then be determined according to:

$$R_{el} = (WW^H)^{-1}WR_b W^H(WW^H)^{-1}.$$

The covariance matrix, $R_{el}$, is then used by radio transceiver device 200 to determine complex weight vectors that are robust for time varying channel conditions.

Further embodiments applicable to radio transceiver device 200 will be disclosed below.

Reference is now made to FIG. 4 illustrating a method for obtaining complex weight vectors as performed by radio transceiver device 300 according to an embodiment.

As disclosed above, the complex weight vectors are determined based on measurements of reference signals transmitted by radio transceiver device 300. Therefore, the radio transceiver device 300 is configured to perform step S204:

S204: Radio transceiver device 300 transmits reference signals to radio transceiver device 200. The reference signals are transmitted by applying precoding weight vectors in a sequential order at an analog antenna array of radio transceiver device 300. The precoding weight vectors as well as the sequential order (in which the precoding weight vectors are applied) are known to radio transceiver device 200.

As disclosed above, radio transceiver device 200 in step S110 provides an indication of the complex weight vectors to radio transceiver device 300. Hence, the radio transceiver device 300 is configured to perform step S206:

S206: Radio transceiver device 300 obtains an indication of the complex weight vectors from radio transceiver device 200. The complex weight vectors are based on channel estimates for each individual antenna element of the antenna array. The channel estimates have been determined using measurements of the reference signals in combination with knowledge of the precoding weight vectors and the sequential order. The complex weight vectors are to be used for subsequent data transmission to radio transceiver device 200.

Embodiments relating to further details of obtaining complex weight vectors as performed by radio transceiver device 300 will now be disclosed.

As disclosed above, there could be different ways for radio transceiver device 200 to know the precoding weight vectors and the sequential order in which the precoding weight vectors are to be applied at radio transceiver device 300. In some aspects the precoding weight vectors and the sequential order are hardcoded, or standardized. In other aspects radio transceiver device 200 configures radio transceiver device 300 with the precoding weight vectors and the sequential order. Hence, according to an embodiment radio transceiver device 300 is configured to perform (optional) step S202:

S202: Radio transceiver device 300 obtains configuration information from radio transceiver device 200. The configuration information is obtained before transmitting the reference signals. The configuration information identifies the precoding weight vectors and the sequential order in which the precoding weight vectors are to be applied.

In this respect the configuration information could be implicit and comprise a reference, or an index, to the precoding weight vectors and the sequential order, or be explicit and comprise the precoding weight vectors themselves and the sequential order itself.

As disclosed above, the complex weight vectors to be used for subsequent data transmission by radio transceiver device 300. Hence, according to an embodiment radio transceiver device 300 is configured to perform (optional) step S208:

S208: Radio transceiver device 200 transmits data to radio transceiver device 200. The data is transmitted by radio transceiver device 300 using the complex weight vectors applied at the analog antenna array (of radio transceiver device 300).

Further embodiments applicable to radio transceiver device 200 and radio transceiver device 300 will be disclosed next.

There could be different types of complex weight vectors. In some aspects the complex weight vectors at least relate to phase. That is, according to an embodiment the complex weight vectors at least define phase settings of the analog antenna array (of radio transceiver device 300). The phase settings can be applied at the phase shifters 350 of the antenna elements 370.

In some aspects the complex weight vectors relate also to gain. That is, according to an embodiment the complex weight vectors further define gain settings of the analog antenna array (of radio transceiver device 300).). The gain settings can be applied at the gain controllers 360 of the antenna elements 370.

There could be different ways to provide the indication of the complex weight vectors. The indication could be an implicit indication of the complex weight vectors. Thus, according to an embodiment the indication is represented by an index to a codebook of complex weight vectors. The indication could be a explicit indication of the complex weight vectors. Thus, according to another embodiment the indication is represented by the complex weight vectors themselves. The explicit indication might give better performance but at a cost of larger signaling overhead. For example, in case the radio propagation channel between radio transceiver device 200 and radio transceiver device 300 is stationary, it might be preferred to use the explicit indication. For stationary radio propagation channels the complex weight vectors might not need to be updated as frequently as for nonstationary radio propagation channels and hence the extra signaling overhead needed for the explicit indication is insignificant.

There could be different examples of reference signals. In some aspects the reference signals are UL reference signals. Particularly, according to an embodiment the reference signals are sounding reference signals (SRS).

In some aspects each precoding weight vector corresponds to a beam. Particularly, according to an embodiment the precoding weight vectors correspond to directional beams 150 in which the reference signals are transmitted according to the sequential order.

In some aspects radio transceiver device 300 transmits the reference signals in M≥N beams, where N equals the number of antenna elements at radio transceiver device 300 in order for radio transceiver device 200 to be able to convert the channel estimates per beam to channel estimates per individual antenna element. Hence, according to an embodiment the antenna array comprises N antenna elements and the reference signals are transmitted using M precoding weight vectors, where M≥N.

Figure 5:
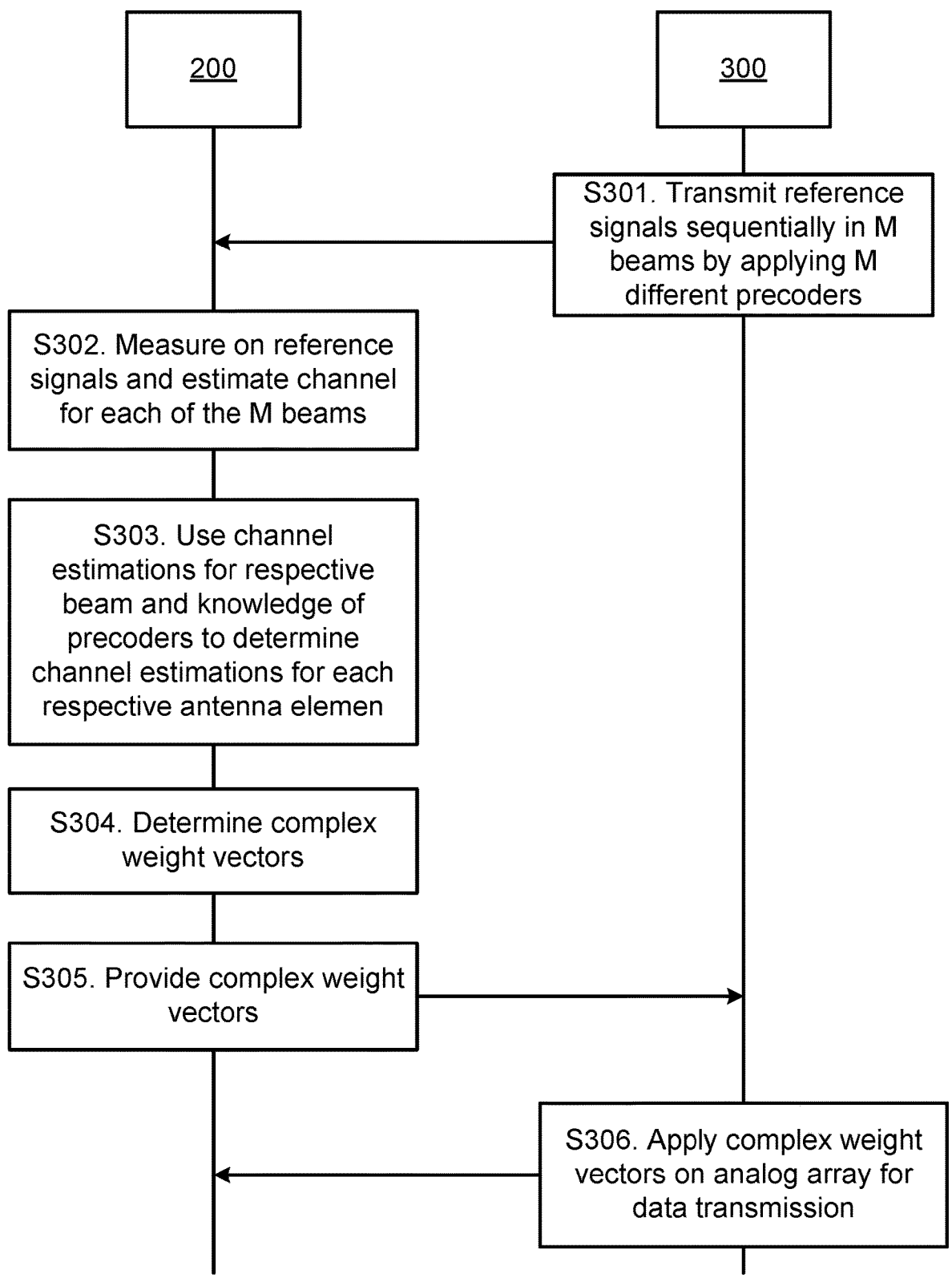
FIG. 5 is a signalling diagram according to an embodiment.

One particular embodiment for determining complex weight vectors and for obtaining complex weight vectors based on at least some of the above disclosed embodiments will now be disclosed in detail with reference to the signalling diagram of FIG. 5 where radio transceiver device 200 is implemented as a network node and radio transceiver device 300 is implemented as a terminal device.

S301: Radio transceiver device 300 transmits reference signals in M beams, for example by applying Discrete Fourier Transform (DFT) based precoding weight vectors on the phase shifters of the analog antenna array of radio transceiver device 300. One way to implement step S301 is to perform step S204.

S302: Radio transceiver device 200 receives the reference signals and estimates the channel for the beams. Radio transceiver device 200 knows which precoding weight vectors that were used to form the M beams. One way to implement step S302 is to perform step S104.

S303: Radio transceiver device 200 uses above Equations (1) and (2) or Equation (4) to transform the channel estimates for the M to N channel estimates such that there is one channel estimate for each antenna element at radio transceiver device 300. Radio transceiver device 200 thus determines channel estimates for each individual antenna element of radio transceiver device 300. One way to implement step S303 is to perform step S106.

S304: Radio transceiver device 200 uses the channel estimates to evaluate suitable phase and/or amplitude settings of the analog antenna array at radio transceiver device 300, and hence determine the complex weight vectors, in order to enhance the performance for coming data transmissions from radio transceiver device 300. One way to implement step S304 is to perform step S108.

S305: Radio transceiver device 200 informs radio transceiver device 300 of the complex weight vectors weights by providing an indication of the complex weight vectors to radio transceiver device 300. Radio transceiver device 300 thereby obtains an indication of the complex weight vectors weights. The indication could be an implicit indication or a explicit indication of the complex weight vectors. One way to implement step S305 is to perform steps S110 and S206.

S306: Radio transceiver device 300 applies the complex weight vectors for coming data transmissions to radio transceiver device 200 and transmits data that is received by radio transceiver device 200. One way to implement step S306 is to perform steps S112 and S208.

Figure 6:
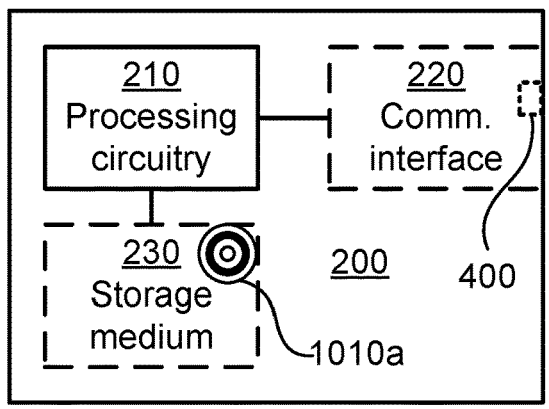
FIG. 6 is a schematic diagram showing functional units of a radio transceiver device according to an embodiment.

FIG. 6 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause radio transceiver device 200 to perform a set of operations, or steps, S102-S112, as disclosed above. For example, the storage medium 230 may store the set of operations, and the processing circuitry 210 may be configured to retrieve the set of operations from the storage medium 230 to cause radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

Radio transceiver device 200 may further comprise a communications interface 220 for communications with other nodes, entities, devices, and functions of the communications network 100. As such the communications interface 220 may comprise one or more transmitters and receivers, comprising analogue and digital components. According to some aspects the TRP 400 is part of, integrated with, or co-located with, the communications interface 220. Hence, according to some aspects the communications interface 220 comprises at least one TRP 400.

The processing circuitry 210 controls the general operation of radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of radio transceiver device 200 are omitted in order not to obscure the concepts presented herein.

Figure 7:
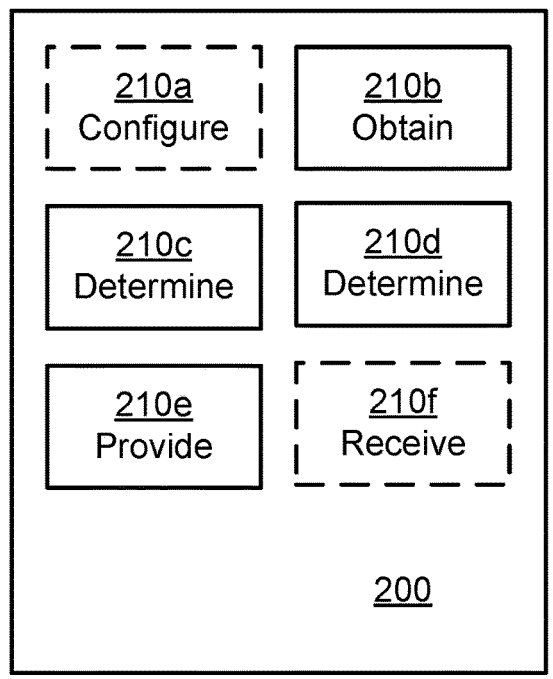
FIG. 7 is a schematic diagram showing functional modules of a radio transceiver device according to an embodiment.

FIG. 7 schematically illustrates, in terms of a number of functional modules, the components of a radio transceiver device 200 according to an embodiment. Radio transceiver device 200 of FIG. 7 comprises a number of functional modules; an obtain module 210*b* configured to perform step S104, a determine module 210*c* configured to perform step S106, a determine module 210*d* configured to perform step S108, and a provide module 210*e* configured to perform step S110. Radio transceiver device 200 of FIG. 7 may further comprise a number of optional functional modules, such as any of a configure module 210*a* configured to perform step S102, and a receive module 210*f* configured to perform step S112. In general terms, each functional module 210*a*-210*f* may be implemented in hardware or in software. Preferably, one or more or all functional modules 210*a*-210*f* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*f* and to execute these instructions, thereby performing any steps of radio transceiver device 200 as disclosed herein.

In some aspects radio transceiver device 200 is part of, provided in, or co-located with a network node (such as an access node, or a radio access network node, etc.). In some aspects there is thus provided a network node comprising radio transceiver device 200. In further aspects radio transceiver device 200 is a network node.

Radio transceiver device 200 may thus be provided as a standalone device or as a part of at least one further device. For example, radio transceiver device 200 may be provided in a node of the radio access network 110 or in a node of the core network 120. Alternatively, functionality of radio transceiver device 200 may be distributed between at least two devices, or nodes. These at least two nodes, or devices, may either be part of the same network part (such as the radio access network 110 or the core network 120) or may be spread between at least two such network parts.

Thus, a first portion of the instructions performed by radio transceiver device 200 may be executed in a first device, and a second portion of the of the instructions performed by radio transceiver device 200 may be executed in a second device; the herein disclosed embodiments are not limited to any particular number of devices on which the instructions performed by radio transceiver device 200 may be executed. Hence, the methods according to the herein disclosed embodiments are suitable to be performed by a radio transceiver device 200 residing in a cloud computational environment.

Therefore, although a single processing circuitry 210 is illustrated in FIG. 6 the processing circuitry 210 may be distributed among a plurality of devices, or nodes. The same applies to the functional modules 210*a*-210*f* of FIG. 7 and the computer program 1020*a* of FIG. 10 (see below).

Figure 8:
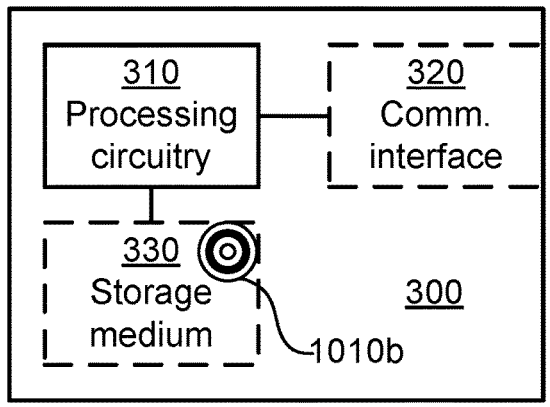
FIG. 8 is a schematic diagram showing functional units of a radio transceiver device according to an embodiment.

FIG. 8 schematically illustrates, in terms of a number of functional units, the components of a radio transceiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010*b* (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause radio transceiver device 300 to perform a set of operations, or steps, S202-S208, as disclosed above. For example, the storage medium 330 may store the set of operations, and the processing circuitry 310 may be configured to retrieve the set of operations from the storage medium 330 to cause radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

Radio transceiver device 300 may further comprise a communications interface 320 for communications with other nodes, entities, devices, and functions of the communications network 100. As such the communications interface 320 may comprise one or more transmitters and receivers, comprising analogue and digital components.

The processing circuitry 310 controls the general operation of radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of radio transceiver device 300 are omitted in order not to obscure the concepts presented herein.

Figure 9:
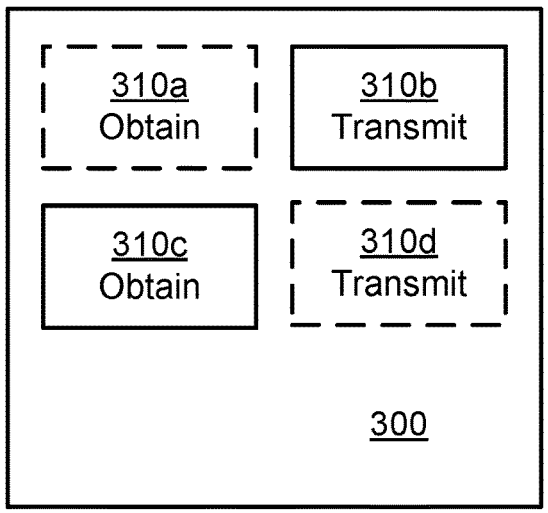
FIG. 9 is a schematic diagram showing functional modules of a radio transceiver device according to an embodiment.

FIG. 9 schematically illustrates, in terms of a number of functional modules, the components of a radio transceiver device 300 according to an embodiment. Radio transceiver device 300 of FIG. 9 comprises a number of functional modules; a transmit module 310*b* configured to perform step S204, and an obtain module 310*c* configured to perform step S206. Radio transceiver device 300 of FIG. 9 may further comprise a number of optional functional modules, such as any of an obtain module 310*a* configured to perform step S202, and a transmit module 310*d* configured to perform step S208. In general terms, each functional module 310*a*-310*d* may be implemented in hardware or in software. Preferably, one or more or all functional modules 310*a*-310*d* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*d* and to execute these instructions, thereby performing any steps of radio transceiver device 300 as disclosed herein.

In some aspects radio transceiver device 300 is part of, provided in, or co-located with a terminal device. In some aspects there is thus provided a terminal device comprising radio transceiver device 300. In further aspects radio transceiver device 300 is a terminal device.

Figure 10:
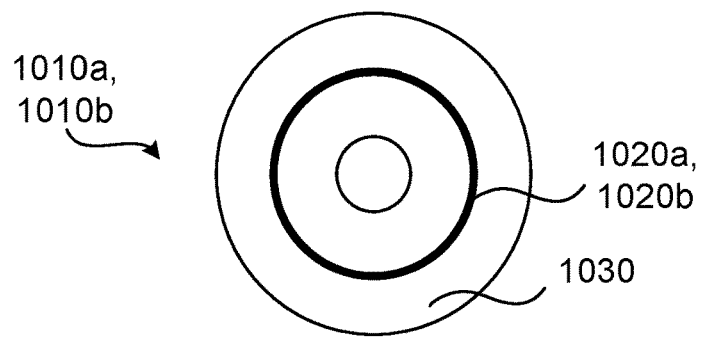
FIG. 10 shows one example of a computer program product comprising to computer readable means according to an embodiment.

FIG. 10 shows one example of a computer program product 1010*a*, 1010*b* comprising computer readable means 1030. On this computer readable means 1030, a computer program 1020*a* can be stored, which computer program 1020*a* can cause the processing circuitry 210 and thereto operatively coupled entities and devices, such as the communications interface 220 and the storage medium 230, to execute methods according to embodiments described herein. The computer program 1020*a* and/or computer program product 1010*a* may thus provide means for performing any steps of radio transceiver device 200 as herein disclosed. On this computer readable means 1030, a computer program 1020*b* can be stored, which computer program 1020*b* can cause the processing circuitry 310 and thereto operatively coupled entities and devices, such as the communications interface 320 and the storage medium 330, to execute methods according to embodiments described herein. The computer program 1020*b* and/or computer program product 1010*b* may thus provide means for performing any steps of radio transceiver device 300 as herein disclosed.

In the example of FIG. 10, the computer program product 1010*a*, 1010*b* is illustrated as an optical disc, such as a CD (compact disc) or a DVD (digital versatile disc) or a Blu-Ray disc. The computer program product 1010*a*, 1010*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020*a*, 1020*b* is here schematically shown as a track on the depicted optical disk, the computer program 1020*a*, 1020*b* can be stored in any way which is suitable for the computer program product 1010*a*, 1010*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining complex weight vectors, the method being performed by a network node that provides network access to a terminal device having an analog antenna array comprising a first antenna element and a second antenna element, the method comprising:
the network node receiving reference signals transmitted by the terminal device, wherein receiving the reference signals comprises: i) receiving, during a first period of time, a first reference signal transmitted by the terminal device using a first beam corresponding to a first precoding weight vector applied to the analog antenna array and ii) receiving, during a second period of time, a second reference signal transmitted by the terminal device using a second beam corresponding to a second precoding weight vector applied to the analog antenna array, wherein i) the second precoding weight vector is different than the first precoding weight vector, ii) the first and second precoding weight vectors are known to the network node prior to the network node receiving the reference signals, and iii) the sequential order in which the first and second beams are used by the terminal device to transmit the first and second reference signals is known to the network node prior to the network node receiving the first and second reference signals;
the network node obtaining measurements of the received reference signals, wherein obtaining measurements of the received reference signals comprises: i) obtaining a first measurement based on the received first reference signal and ii) obtaining a second measurement based on the received second reference signal;
the network node determining a channel estimate for each antenna element included in the analog antenna array, wherein determining a channel estimate for each antenna element included in the analog antenna array comprises:
i) determining a first channel estimate for the first antenna element using: a) the knowledge of the precoding weight vectors and the sequential order and b) the obtained first measurement and
ii) determining a second channel estimate for the first antenna element using: a) the knowledge of the precoding weight vectors and the sequential order and b) the obtained second measurement;
the network node determining complex weight vectors to be used for subsequent data transmission from the terminal device using the first channel estimate for the first antenna element and the second channel estimate for the second antenna element; and
the network node providing an indication of the complex weight vectors to the terminal device.

2. The method of claim 1, wherein the precoding weight vectors are taken from a precoding matrix, and wherein determining the channel estimates involves inverting the precoding matrix.

3. The method of claim 1, wherein the channel estimates are determined using zero-forcing, ZF, or linear minimum mean square error, LMMSE, channel estimation.

4. The method of claim 1, wherein the complex weight vectors are determined so as to maximize a quality criterion of the subsequent data transmission.

5. The method of claim 1, wherein the complex weight vectors are based on channel estimates as averaged over at least two time samples of the reference signals.

6. The method of claim 1, wherein the complex weight vectors at least define phase settings of the analog antenna array.

7. The method of claim 6, wherein the complex weight vectors further define gain settings of the analog antenna array.

8. The method of claim 1, wherein the indication is represented by an index to a codebook of complex weight vectors.

9. The method of claim 1, wherein the indication is represented by the complex weight vectors themselves.

10. The method of claim 1, wherein the reference signals are sounding reference signals, SRS.

11. The method of claim 1, wherein the precoding weight vectors correspond to directional beams in which the reference signals are transmitted according to the sequential order.

12. The method of claim 1, wherein the antenna array comprises N antenna elements and wherein the reference signals are transmitted using M precoding weight vectors, where M≥N.

13. The method of claim 1, further comprising:
receiving data transmission from the terminal device, the data transmission being transmitted by the terminal device using the complex weight vectors applied at the analog antenna array.

14. The method of claim 1, further comprising:
configuring, before obtaining the measurements, the terminal device with the precoding weight vectors and the sequential order in which the precoding weight vectors are to be applied.

15. A method for obtaining complex weight vectors, the method being performed by a terminal device being served by a network node that is configured to provide network access to the terminal device, wherein the terminal device comprises an analog antenna array comprising a first antenna element and a second antenna element, the method comprising:

the terminal device transmitting reference signals to the network node by applying precoding weight vectors in a sequential order at the analog antenna array of the terminal device, the precoding weight vectors as well as the sequential order being known to the network node, wherein the network node is configured to provide network access to the terminal device, and wherein transmitting the reference signals to the network node comprises: i) using a first beam corresponding to a first precoding weight vector applied to the analog antenna array to transmit, during a first period of time, a first reference signal to the network node and ii) using a second beam corresponding to a second precoding weight vector applied to the analog antenna array to transmit, during a second period of time, a second reference signal to the network node, wherein i) the second precoding weight vector is different than the first precoding weight vector, ii) the first and second precoding weight vectors are known to the network node prior to the network node receiving the reference signals, and iii) the sequential order in which the first and second beams are used by the terminal device to transmit the first and second reference signals is known to the network node prior to the network node receiving the first and second reference signals; and the terminal device obtaining an indication of the complex weight vectors from the network node, wherein the complex weight vectors are based on channel estimates for each antenna element of the antenna array, wherein the channel estimates have been determined using measurements of the first and second reference signals in combination with knowledge of the precoding weight vectors and the sequential order, and wherein the complex weight vectors are to be used for subsequent data transmission to the network node.

16. The method of claim 15, further comprising:
obtaining, before transmitting the reference signals, from the network node, configuration information, the configuration information identifying the precoding weight vectors and the sequential order in which the precoding weight vectors are to be applied.

17. The method of claim 15, further comprising:
transmitting data to the network node, the data being transmitted by using the complex weight vectors applied at the analog antenna array.

18. A network node for determining complex weight vectors for a terminal device to which the network node is providing network access, the network node comprising processing circuitry, the processing circuitry being configured to cause the network node to:

receive reference signals transmitted by the terminal device, wherein receiving the reference signals comprises: i) receiving, during a first period of time, a first reference signal transmitted by the terminal device using a first beam corresponding to a first precoding weight vector applied to the analog antenna array and ii) receiving, during a second period of time, a second reference signal transmitted by the terminal device using a second beam corresponding to a second precoding weight vector applied to the analog antenna array, wherein i) the second precoding weight vector is different than the first precoding weight vector, ii) the first and second precoding weight vectors are known to the network node prior to the network node receiving the reference signals, and iii) the sequential order in which the first and second beams are used by the terminal device to transmit the first and second reference signals is known to the network node prior to the network node receiving the first and second reference signals;

obtain measurements of the received reference signals, wherein obtaining measurements of the received reference signals comprises: i) obtaining a first measurement based on the received first reference signal and ii) obtaining a second measurement based on the received second reference signal;

determine a channel estimate for each antenna element included in the analog antenna array, wherein determining a channel estimate for each antenna element included in the analog antenna array comprises: i) determining a first channel estimate for the first antenna element using: a) the knowledge of the precoding weight vectors and the sequential order and b) the obtained first measurement and ii) determining a second channel estimate for the first antenna element using: a) the knowledge of the precoding weight vectors and the sequential order and b) the obtained second measurement;

determine complex weight vectors to be used for subsequent data transmission from the terminal device using the first channel estimate for the first antenna element and the second channel estimate for the second antenna element; and provide an indication of the complex weight vectors to the terminal device.

19. A network node for determining complex weight vectors, the network node comprising:
processing circuitry; and
a storage medium storing instructions that, when executed by the processing circuitry, cause the network node to perform the method of claim 1.

20. A terminal device for obtaining complex weight vectors, the terminal device comprising:
an analog antenna array comprising a first antenna element and a second antenna element; and
processing circuitry, the processing circuitry being configured to cause the terminal device to:

transmit reference signals to a network node by applying precoding weight vectors in a sequential order at the analog antenna array of the terminal device, the precoding weight vectors as well as the sequential order being known to the network node, and wherein the terminal device is configured to transmit the reference signals to the network node by: i) using a first beam corresponding to a first precoding weight vector applied to the analog antenna array to transmit, during a first period of time, a first reference signal to the network node and ii) using a second beam corresponding to a second precoding weight vector applied to the analog antenna array to transmit, during a second period of time, a second reference signal to the network node, wherein i) the second precoding weight vector is different than the first precoding weight vector, ii) the first and second precoding weight vectors are known to the network node prior to the network node receiving the reference signals, and iii) the sequential order in which the first and second beams are used by the terminal device to transmit the first and second reference signals is known to the network node prior to the network node receiving the first and second reference signals; and obtain an indication of the complex weight vectors from the network node, wherein the complex weight vectors are based on channel estimates for each antenna element of the antenna array, wherein the channel estimates have been determined using measurements of the first and second reference signals in combination with knowledge of the precoding weight vectors and the sequential order, and wherein the complex weight vectors are to be used for subsequent data transmission to the network node.

21. A terminal device for obtaining complex weight vectors, the terminal device comprising:
processing circuitry; and
a storage medium storing instructions that, when executed by the processing circuitry, cause the terminal device to perform the method of claim 15.

22. A computer program product comprising a non-transitory computer readable medium storing a computer program for determining complex weight vectors, the computer program comprising computer code which, when run on processing circuitry of a network node, causes the network node to perform the method of claim 1.

23. A computer program product comprising a non-transitory computer readable medium storing a computer program for obtaining complex weight vectors, the computer program comprising computer code which, when run on processing circuitry of a terminal device, causes the terminal device to perform the method of claim 15.

24. The method of claim 1, wherein the method further comprises, prior to determining the channel estimates for each antenna element included in the analog antenna array, determining a set of channel estimates for a set of beams, the set of channel estimates for the set of beams comprising a first channel estimate for the first beam and a second channel estimate for the second beam, and determining the channel estimates for each antenna element included in the analog antenna array comprises transforming the set of channel estimates for the set of beams using the first and second precoding weight vectors.

* * * * *

UNITED STATES PATENT AND TRADEMARK OFFICE
CERTIFICATE OF CORRECTION

PATENT NO. : 10,587,317 B2
APPLICATION NO. : 15/543865
DATED : March 10, 2020
INVENTOR(S) : Athley et al.

Page 1 of 1

It is certified that error appears in the above-identified patent and that said Letters Patent is hereby corrected as shown below:

In the Specification

In Column 1, Line 66, delete "omni-directional-like" and insert -- omni-directional like --, therefor.

In Column 2, Line 31, delete "weighs." and insert -- weights. --, therefor.

In Column 5, Line 21, delete "weighs." and insert -- weights. --, therefor.

In Column 5, Line 26, delete "eight," and insert -- eighth, --, therefor.

In Column 5, Line 30, delete "eight," and insert -- eighth, --, therefor.

In Column 6, Line 5, delete "comprising to" and insert -- comprising --, therefor.

In Column 6, Line 28, delete "fifth (5G)" and insert -- fifth generation (5G) --, therefor.

In Column 9, Line 48, delete "signal-to-noise (SNR)," and insert -- signal-to-noise ratio (SNR), --, therefor.

In the Claims

In Column 16, Line 7, in Claim 1, delete "measurement and" and insert -- measurement; and --, therefor.

Signed and Sealed this
Twenty-second Day of September, 2020

Andrei Iancu
*Director of the United States Patent and Trademark Office*